Figures 1, 3:
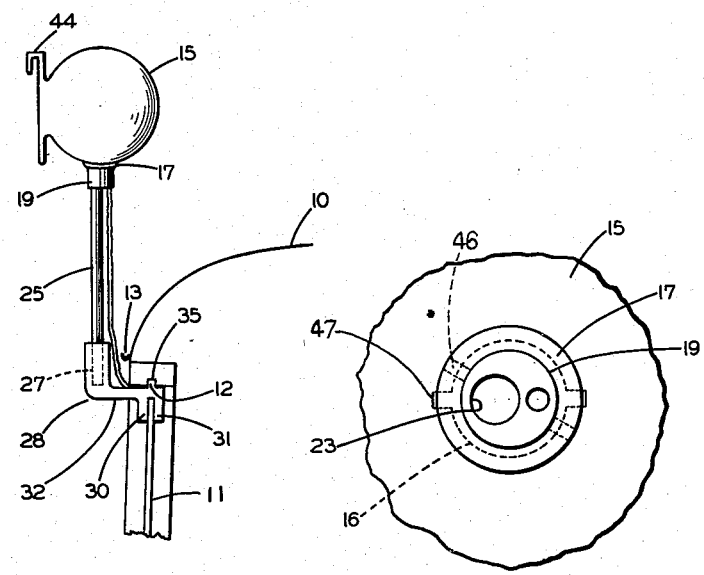

Oct. 27, 1953   J. P. ZAPPIA   2,657,379
WARNING DEVICE FOR VEHICLES
Filed Feb. 8, 1952

INVENTOR.
JOSEPH ZAPPIA
BY
*Eber J. Hyde*
ATTORNEY

Patented Oct. 27, 1953

2,657,379

UNITED STATES PATENT OFFICE 2,657,379

WARNING DEVICE FOR VEHICLES

Joseph P. Zappia, Maple Heights, Ohio

Application February 8, 1952, Serial No. 270,679

4 Claims. (Cl. 340—366)

This invention pertains to a warning device particularly adapted for emergency use when an automobile, truck, bus or the like has become disabled on the road.

At the present time there is great danger on the highway at night when an automobile, truck or bus becomes disabled and pulls partly to the side of the road. Vehicles which come up to the disabled car are apt to crash into it as many drivers operate their cars at a speed such that they cannot stop in the distance shown by their headlights to be clear.

Warning devices are available to operators of vehicles but usually they don't use them unless, as in the case of truck drivers, the law requires a warning signal.

An object of the invention is to provide a warning device which can be installed in any car, truck or bus and which, after it is installed, is so easy to put into operation that many operators of vehicles will use them.

A further object of my invention is to provide a warning light which may be quickly and easily mounted on an automobile. Another object of the invention is to provide a light which may be operated as a trouble light as well as a blinking warning light.

For a better understanding of the present invention, together with other and further objects thereof, reference is had to the following description taken in connection with the accompanying drawings, and its scope will be pointed out in the appended claims.

Figure 2:
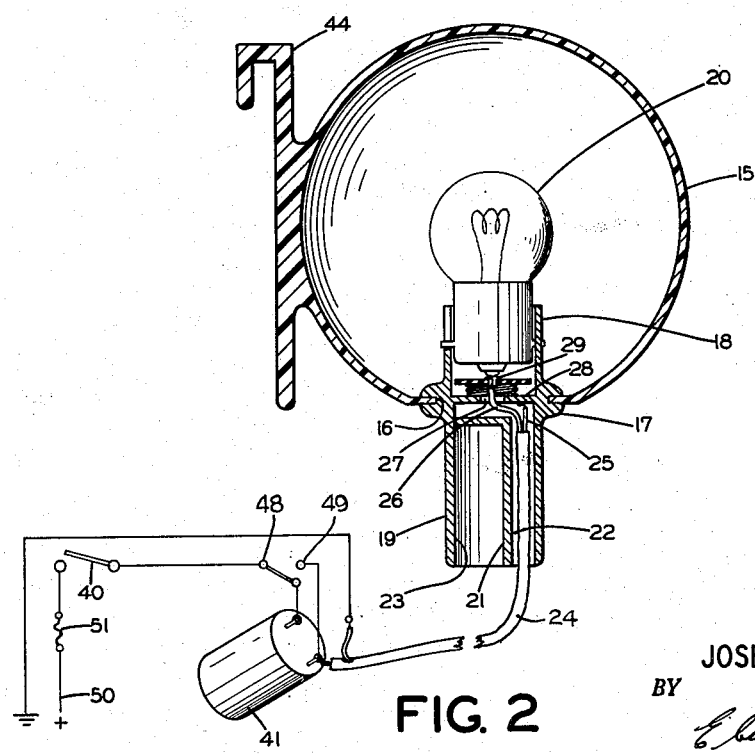

In the drawings:

Figure 1 of the drawing is a view showing the device of the invention secured to the top edge of an automobile window;

Figure 2 of the drawing is a sectional view taken through the device of the invention;

Figure 3 is a bottom view of the warning light.

Referring to Figure 1 of the drawing there is shown a portion of the top 10 of an automobile having a window 11 which is adapted to be raised and lowered. When raised the window 11 fits into the groove 12 in the upper window frame to provide an air-tight seal and to support the top edge of the window against lateral motion.

The top of the automobile 10 is provided with a shallow trough 13 which extends along both sides of the car above the doors and windows, as is well known, to prevent water on the roof from running down into the windows when the windows are open, and to prevent water from running off the top onto persons getting into or out of the car.

The device of the invention comprises a hollow ball 15 made of glass, plastic or the like, through which light can shine. Preferably the hollow ball 15 should be translucent and it should be red, though it is also within the scope of the invention to use clear transparent glass or plastic with a suitable light bulb or other means within it to give the preferred red color.

The translucent red ball 15 has an opening 16 in its bottom portion into which is secured a socket member 17 having a light bulb engaging portion 18 located within the ball 15 and an extension member engaging portion 19 located outside of and below the ball.

The light bulb engaging portion 18 is adapted to hold a light bulb 20 and includes the usual socket device into which the bulb 20 can be replaceably secured to establish an electrical circuit through the bulb.

The extension member engaging portion 19 is tubular and has a partition 21 which divides the member into a wire receiving passageway 22 and an extension rod engaging socket 23. A double wire 24 extends through the passageway 22 and the ground wire 25 is connected to the socket member 19 which preferably is made of metal. The other wire 26 passes through a hole 27 in the partition 28 and is connected to a spring biased contact 29 which engages the center contact of the bulb 20. The extension rod engaging socket 23 preferably is round in cross-section and is of a diameter to snugly receive a standard wooden dowel rod, such for example as a length of ⅜ inch dowel which acts as an extension member 25.

The other end of the extension member 25 snugly fits in a similar socket 27 in a window bracket 28, and the window bracket 28 is adapted to be held, as shown in Figure 1, between the raised window glass 11 and the window frame of an automobile.

The window bracket 28 preferably is made of plastic material, and comprises a central portion 32, two downwardly extending leg members 30, 31 secured to the central portion and adapted to straddle the window glass 11 and an upwardly facing socket member 27 also connected to the central portion. Immediately above the two leg members there is a ridge member 35 forming part of the window bracket. The ridge member is located substantially directly above and between the two leg members 30, 31.

The window bracket 28 is secured in place merely by lowering one of the windows on the left hand side of the car and placing the bracket 28 with the legs straddling the window glass 11 and with the socket member 27 on the outside of the car. The window is then raised until the ridge member 35 rests in the groove in the window frame normally occupied by the window glass when the window is closed. The door may be opened and closed with the bracket in place, facilitating inserting one end of the extension rod 25 in the socket 27. The translucent red ball member 15 is then placed on the other end of the extension rod. The light cord runs through the slight open crack between the window glass and the window frame caused by the bracket 28 being in place. The switch 40 is then closed to light the bulb 20.

Though not essential, it is desirable that the warning light blink to attract attention. An automatic circuit interrupter 41 is placed in the circuit to periodically make and break the circuit. Such an interrupter is well known to the art as it is used in the ordinary turn indicator for automobiles.

The translucent red ball 15 has a hook member 44 connected to it. When the warning light is not in use the wire can be wound about the hook member and the hook member used to hold the unit under the dash board. The hook may also be used to attach the warning light to the outside of the car. Most automobiles have a small gutter in the top above the windows and doors. The hook member 44 will suspend the warning light from this gutter, in which event the extension rod and window bracket need not be used.

When the device is to be used as a trouble light instead of a warning light, the socket member 17 is removed from the ball 15 merely by turning them with respect to each other until the ears 46 on the socket register with the slots 47 in the bottom of the ball 15, at which location they come apart readily. The switch 48 is then moved from its normal position shown in Figure 2 until it engages contact 49. The interrupter is then cut out of the circuit and the bulb 20 will give a steady light.

It is contemplated that a car owner, upon purchasing one of these warning light units will install it by connecting the wire 50 to a source of current, preferably under the dash board. The unit thereafter is ready for immediate use simply by unwinding the wire, putting the window bracket in place or hanging the device on the drip gutter, and throwing the switch 40.

The warning device is mounted high above the top of the car if the extension rod is used, and it is approximately level with the top of the car if the extension rod is not used. In either position the light can be made to blink off and on or it can be made to give out a steady light. Further, the light bulb and socket can be removed from the ball 15 and used around the car as a trouble light.

While there have been described what are at present considered to be the preferred embodiments of this invention it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A warning light for an automobile comprising: a translucent ball having an opening in the bottom portion thereof, a hook member secured to the side of said ball, a socket member secured in the opening in the bottom of the ball and having a light bulb engaging portion within the ball and an extension member engaging portion outside of said ball, an extension member one end of which cooperates with said engaging portion, a window bracket adapted to be secured between the top edge of the automobile window and the window frame including means for holding said extension member upright above said automobile, and electrical wires connected to said socket member for connecting a bulb within said socket to the electrical system of said automobile.

2. A warning light for an automobile comprising: a translucent plastic ball having an opening in the bottom portion thereof, a grooved socket member replaceably secured in said opening and having a light bulb engaging portion within the ball and an extension member engaging portion outside of said ball, an extension member one end of which engages said engaging portion of said extension member, means for securing the other end of said extension member to said automobile for holding said light above said automobile, and electrical circuit means connected to said light bulb engaging portion for connecting a bulb therein to the electrical system of said automobile.

3. A warning light as set forth in claim 2, further characterized by blinker means connected in said electrical circuit means to cause said warning light to blink off and on.

4. A warning light for an automobile comprising: a translucent ball having an opening in the bottom portion thereof, a socket member replaceably secured in the said opening and having a light bulb engaging portion within the ball and an extension member engaging portion outside of said ball, an extension member one end of which engages said extension member engaging portion, a window bracket including a split portion for straddling the window glass in an automobile when the window is lowered and a portion for engaging the window frame when said window is raised to clamp the bracket in a fixed position, said bracket including means for engaging and holding the other end of said extension member, and electrical circuit means connected to said light bulb engaging portion of said socket member.

JOSEPH P. ZAPPIA.

References Cited in the file of this patent

UNITED STATES PATENTS

| Number | Name | Date |
|---|---|---|
| 669,357 | Stanley | Mar. 5, 1901 |
| 1,064,515 | Miller | June 10, 1913 |
| 2,165,562 | Mack et al. | July 11, 1939 |
| 2,496,618 | Cox et al. | Feb. 7, 1950 |